(12) United States Patent
Lemke

(10) Patent No.: US 7,270,108 B2
(45) Date of Patent: Sep. 18, 2007

(54) OPPOSED PISTON, HOMOGENEOUS CHARGE PILOT IGNITION ENGINE

(75) Inventor: James U. Lemke, San Diego, CA (US)

(73) Assignee: Achates Power LLC, San Diego, CA (US)

( * ) Notice: Subject to any disclaimer, the term of this patent is extended or adjusted under 35 U.S.C. 154(b) by 0 days.

(21) Appl. No.: 11/095,250

(22) Filed: Mar. 31, 2005

(65) Prior Publication Data

US 2006/0219213 A1   Oct. 5, 2006

(51) Int. Cl.
F02B 75/18 (2006.01)
F02B 3/00 (2006.01)

(52) U.S. Cl. .................. 123/299; 123/300; 123/53.6

(58) Field of Classification Search .............. 123/299, 123/300, 304–305, 431, 53.6, 27 GE, 525, 123/575
See application file for complete search history.

(56) References Cited

U.S. PATENT DOCUMENTS

| | | | |
|---|---|---|---|
| 4,605,166 A | 8/1986 | Kelly | 239/96 |
| 5,042,441 A * | 8/1991 | Paul et al. | 123/276 |
| 5,058,537 A * | 10/1991 | Paul et al. | 123/51 BA |
| 5,241,935 A | 9/1993 | Beck et al. | 123/300 |
| 5,341,783 A | 8/1994 | Beck et al. | 123/446 |
| 5,392,745 A | 2/1995 | Beck | 123/295 |
| 5,450,829 A | 9/1995 | Beck | 123/435 |
| 5,467,754 A | 11/1995 | Beck et al. | 123/467 |
| 5,551,391 A | 9/1996 | Beck et al. | 123/305 |
| 5,553,575 A | 9/1996 | Beck et al. | 123/198 |
| 5,553,781 A | 9/1996 | Barkhimer et al. | 239/88 |
| 5,641,121 A | 6/1997 | Beck et al. | 239/92 |
| 5,673,673 A | 10/1997 | Beck | 123/527 |
| 5,685,273 A | 11/1997 | Johnson et al. | 123/446 |
| 5,823,429 A | 10/1998 | Beck et al. | 239/5 |
| 5,853,124 A | 12/1998 | Beck et al. | 239/5 |
| 6,170,442 B1 * | 1/2001 | Beale | 123/46 B |
| 6,230,683 B1 | 5/2001 | zur Loye et al. | 123/435 |
| 6,250,264 B1 * | 6/2001 | Henriksen | 123/56.2 |
| 6,273,076 B1 | 8/2001 | Beck et al. | 123/679 |

(Continued)

FOREIGN PATENT DOCUMENTS

WO   WO 2005/124124 A1   12/2005

OTHER PUBLICATIONS

Combustion and Emission Characteristics of Multiple Stage Diesel Combustion, T. Hashizume et al, New ACE Institute Co., Ltd., SAE Technical Paper Series, International Congress and Exposition, Detroit, Michigan, Feb. 23-26, 1998, pp. 1-10.

(Continued)

Primary Examiner—Hai Huynh
(74) Attorney, Agent, or Firm—Incaplaw; Terrance A. Meador

(57) ABSTRACT

An engine of the opposed piston, two-stroke, compression ignition type includes provision for injection of a main charge of liquid fuel into the bore of a cylinder between opposed pistons early in a compression stroke to permit the fuel to evaporate and mix with air during the remainder of the compression stroke to the point where the stoichiometric components of the mixture are insufficient for autoignition. Further provision is made for injection of a pilot charge of liquid fuel into the compressed air/fuel mixture later in the compression stroke. The pilot charge provides a stoichiometric component which autoignites, thereby activating ignition of the compressed air/fuel mixture.

37 Claims, 6 Drawing Sheets

U.S. PATENT DOCUMENTS

| | | | |
|---|---|---|---|
| 6,418,885 B1 * | 7/2002 | Paul et al. | 123/25 C |
| 6,474,323 B1 | 11/2002 | Beck et al. | 123/679 |
| 6,484,674 B2 * | 11/2002 | Valentin | 123/46 R |
| 6,505,600 B1 | 1/2003 | Tetzlaff | 123/295 |
| 6,598,584 B2 | 7/2003 | Beck et al. | 123/299 |
| 6,742,335 B2 | 6/2004 | Beck et al. | 60/605.2 |
| 6,948,475 B1 | 9/2005 | Wong et al. | 123/299 |
| 7,036,482 B2 | 5/2006 | Beck et al. | 123/229 |
| 2005/0274332 A1 | 12/2005 | Lemke et al. | 123/41.35 |

OTHER PUBLICATIONS

A Gas-Generator Turbocompound Engine, Ralph J. Hooker, SAE National West Coast Meeting, San Francisco, Aug. 7, 1956, vol. 65, pp. 293-330.

Chen & Beck, Gas Engine Combustion Principles and Applications, SAE 2001-01-249, SAE Technical Paper Series, Aug. 20, 2001.

* cited by examiner

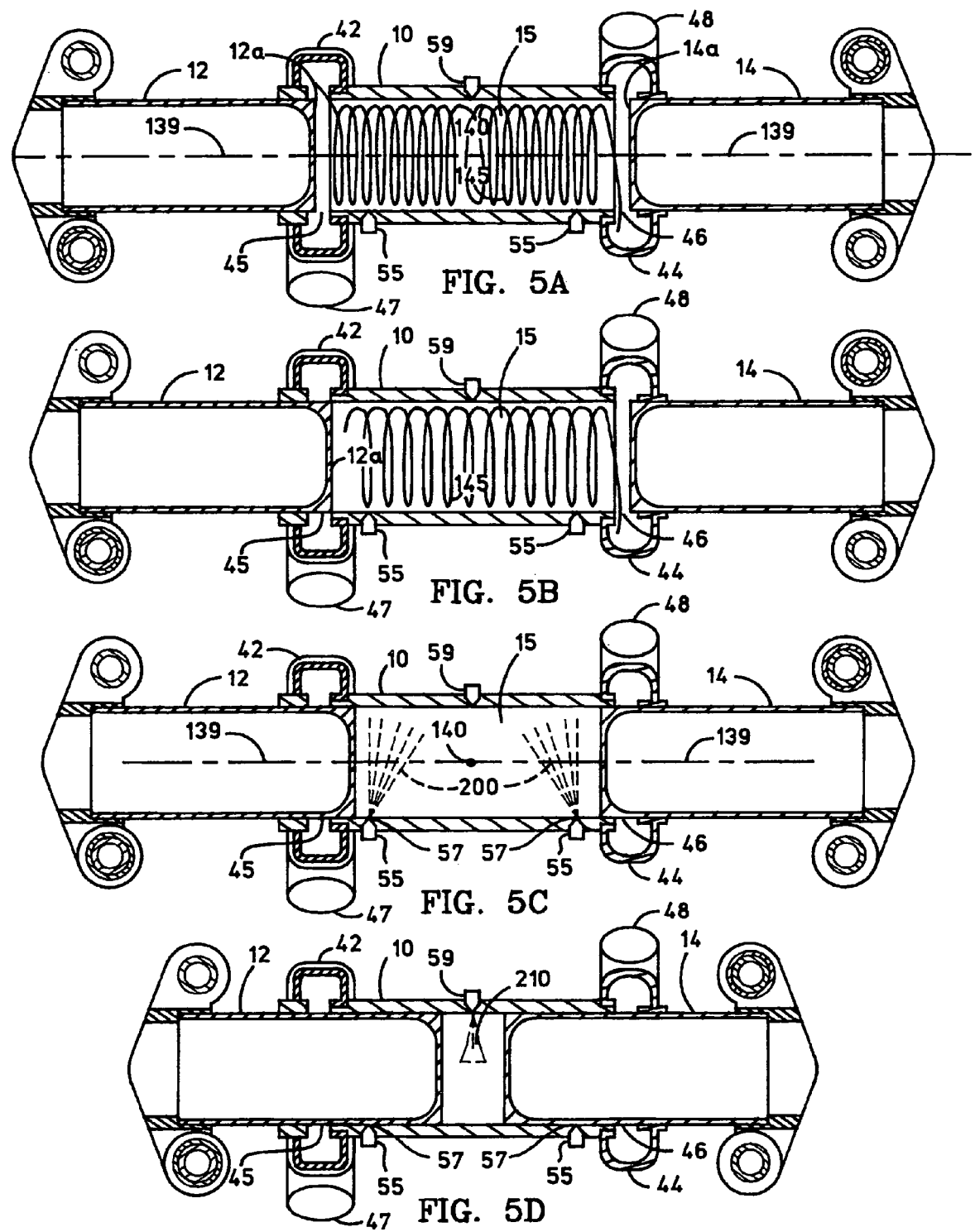

OPPOSED PISTON, HOMOGENEOUS CHARGE PILOT IGNITION ENGINE

CROSS REFERENCE TO RELATED APPLICATIONS

The following copending applications, all commonly assigned to the assignee of this application, contain subject matter related to the subject matter of this application:

U.S. patent application Ser. No. 10/865,707, filed Jun. 10, 2004 for "Two Cycle, Opposed Piston Internal Combustion Engine", published as US2005/0274332A1 on Dec. 29, 2005;

PCT application US05/020553, filed Jun. 10, 2005 for "Improved Two Cycle, Opposed Piston Internal Combustion Engine", published as WO2005/124124A1 on Dec. 15, 2005;

PCT application US06/011886, filed Mar. 30, 2006 for "Opposed Piston, Homogeneous Charge, Pilot Ignition Engine";

U.S. patent application Ser. No. 11/097,909, filed Apr. 1, 2005 for "Common Rail Fuel Injection System With Accumulator Injectors";

PCT application US06/012353, filed Mar. 30, 2006 "Common Rail Fuel Injection System With Accumulator Injectors"; and U.S. patent application Ser. No. 11/378,959, filed Mar. 17, 2006 for "Opposed Piston Engine".

FIELD

This specification relates generally to an engine of the opposed piston, compression ignition type having provision for injection of a main charge of liquid fuel into the cylinder early in a compression stroke of the engine to permit the main charge to evaporate and form a lean homogeneous mixture with air during the remainder of the compression stroke. By the time the compressed air/fuel mixture enters an autoignition temperature range, it lacks sufficient stoichiometric components to support autoignition. Therefore, further provision is made for injection of a pilot fuel charge into the compressed air/fuel mixture later in the compression stroke. The pilot fuel charge supplies a stoichiometric component in a fine mist of small droplets of liquid fuel that autoignites, thereby activating ignition of the main charge.

BACKGROUND

In a conventional compression ignition (CI) engine a single piston is slidably disposed in a cylinder. The piston moves in the cylinder between a top dead center (TDC) position where the crown of the piston is closest to the closed end of the cylinder, and a bottom dead center (BDC) position where the crown is furthest from the closed end. Air introduced into the cylinder is compressed by the piston as it moves toward TDC during its compression stroke. Compression of the air raises its temperature. Liquid fuel is injected into the resulting hot air at a time near the piston reaching the top of its compression stroke. The elevated temperature of the compressed air causes autoignition of the fuel whereby the fuel self-ignites and burns, releasing energy and driving the piston toward BDC in a power stroke.

In an opposed piston, two-stroke, compression ignition engine, two pistons are slidably disposed crown-to-crown in the bore of a cylinder having inlet and exhaust ports near BDC of each piston, with the pistons serving as the valves for the ports. The pistons move coaxially in the cylinder, toward and away from each other, between their TDC and BDC positions. Air introduced into the cylinder is compressed by the pistons as they move toward each other to their respective TDC positions during a compression stroke. The opposed piston CI engine typically has a liquid fuel injector mounted to the cylinder at a location near the TDC position of the piston crowns, usually at, or very near, the longitudinal center of the cylinder. The injected fuel mixes with the compressed air and the air/fuel mixture autoignites, driving the pistons away from each other in a power stroke toward their BDC positions. One such opposed piston engine is disclosed in the referenced '707 patent application.

Compression ignition engines are characterized by a number of undesirable features. One drawback is that the fuel injector is positioned so that injection occurs at or near TDC of the pistons, leaving little time for the injected fuel to vaporize and mix with the compressed air before autoignition occurs. The heterogeneous mixture of air and fuel burns unevenly. Also, some of the injected fuel collects on the surface of the cylinder bore and remains in the orifices of the injector where it fails to burn at all. The result is production of NOx (oxides of nitrogen) and particulate matter (smoke). Further, location of the fuel injection site on the cylinder near piston TDC exposes the injector to the highest pressures and temperatures that occur in the cylinder. The extreme temperatures of combustion can cause fuel trapped in the orifices of the injector to boil during the power stroke, which produces pollutants such as carbon monoxide (CO), unburned hydrocarbons, and soot. Over a period of time the extreme heat can cause carbon to accumulate at the orifices of the injector, thereby interfering with the fuel injection pattern and producing an uneven burn that increases NOx, hydrocarbon and particulate emissions during the power cycle.

In an effort to overcome the problems stemming from heterogeneity of the air/fuel mixture in CI engines, homogeneous charge compression ignition (HCCI) engines have been proposed. The proposals are typically for single piston configurations. In this regard, HCCI operation is the process wherein a homogeneous mixture of air and liquid fuel is ignited by compression of the mixture. In HCCI engines, fuel is injected into the cylinder early in the compression stroke, well before the temperature of the air has reached a level that could initiate autoignition. Early injection assists the fuel to evaporate and disburse throughout the air in the cylinder, with the goal of forming a substantially uniform air/fuel mixture (the homogeneous charge) that is further compressed until autoignition occurs. The amount of fuel injected is controlled in order to provide a lean air/fuel mixture and to control the combustion process in order to yield a significant reduction in NOx and particulate emissions as compared with conventional CI engines.

HCCI combustion was introduced as an alternative to spark ignition (SI) for two cycle internal combustion engines in 1979. When Federal EPA standards requiring drastic reductions in internal combustion engine emission pollutants were introduced in the early 1990's, research and development in HCCI technology saw a dramatic increase. "Over the last seven years, numerous studies have been reported to explore the potential of this technology and many innovative strategies for mixture preparation, combustion control, load extension and emission reduction have been proposed and developed by automotive companies, diesel engine manufacturers, component suppliers, and research institutions." [Homogeneous Charge Compression Ignition (HCCI) Engines, Key Research and Development Issues, SAE Order No. PT-94, 2003].

Although HCCI does provide potential benefits such as fuel efficiency, reduced NOx and lower particulate emissions, this combustion mode also poses problems that the industry and R&D in general have not yet solved. Among the drawbacks of the HCCI engine are high hydrocarbon and CO emissions during certain engine operating conditions, difficulty in controlling combustion timing, and the inability to operate over a broad load range, particularly at power levels in excess of 30% of maximum power.

During low load operation of the HCCI engine, the injected fuel is incompletely burned, which produces significantly higher levels of hydrocarbon and CO emissions than a spark ignition (SI) engine. At high load operation of the HCCI engine it is extremely difficult to control autoignition due to the lack of control of the stoichiometry of the air/fuel components responsible for ignition; early combustion results, producing high engine noise and possible engine damage. For these and other reasons, a multimode HCCI engine has been proposed. During the middle of the operating load range the multimode engine operates as a HCCI engine and, during low load and high load conditions, as a conventional CI or SI engine. The multimode design demands a complex fuel injection system or requires two different fuels; both solutions are cumbersome and add to manufacturing and operation costs.

Thus, a single-mode homogeneous charge engine of the compression ignition type, capable of operating over a broad load operating regime while producing low levels of emission pollutants including NOx, CO, hydrocarbons and particulates, is an extremely desirable objective.

SUMMARY

Injection of a lean main charge of liquid fuel early in the compression stroke of an opposed piston engine permits virtually complete evaporation of the fuel by the time the stroke is nearly complete. The resulting lean homogenous air/fuel mixture contains inadequate stoichiometric air/fuel components to support autoignition when the autoignition temperature range is reached. Injection of a pilot charge constituted of a small mass of liquid fuel in a fine mist of small droplets into the compressed homogenous main charge near TDC of the pistons introduces a stoichiometric element that autoignites and activates ignition of the main charge. Homogenous mixing of the lean main charge provides reduction in the undesirable byproducts of combustion. Control of the pilot charge injection enables precise timing of ignition of the lean homogenous main charge.

A two cycle, opposed piston internal combustion engine overcomes difficulties associated with HCCI engines to date by provision for injection and full evaporation of a lean main charge of liquid fuel. In this regard, "full evaporation" means that there are inadequate remaining liquid components of the main charge to support autoignition. Ignition of the main charge is controlled by injection of a pilot charge constituted of a small mass of liquid fuel in a fine mist of small droplets. The opposed piston HC engine described in this specification includes a cylinder with spaced-apart inlet and exhaust ports operated by opposed pistons disposed in the bore of the cylinder and at least one main fuel injector positioned to inject some or all of the main fuel charge into the cylinder while the pistons are near BDC, while a pilot fuel injector is positioned to inject the pilot charge at or near TDC of the opposed pistons.

For example, two main fuel injectors, dividing the main charge of fuel, may be mounted to communicate with main fuel injection sites on the cylinder wall, one near the inlet port, (displaced slightly towards TDC) and the other near the exhaust port (displaced slightly towards TDC). This configuration locates each main fuel injection site at a part of the cylinder that is relatively cool during engine operation and that is covered by a piston during most of its movement, thus minimizing the inherent undesirable effects produced by exposure of the injectors to high temperature and pressure. By injecting the main charge near the inlet and exhaust ports just after BDC, internal pressures and temperatures in the cylinder are relatively low, encouraging full expansion of the injected spray, and the fuel has a long period of time to evaporate as the pistons move in their compression stroke towards TDC. By the time the pistons are nearly at TDC, the main charge is fully evaporated and mixed with the assistance of swirl; the main air/fuel charge is thus substantially homogeneous. However the evaporated charge lacks sufficient stoichiometric components to support autoignition by the time the compressed air/fuel mixture reaches an autoignition temperature range. In order to ignite the main charge, at least one pilot fuel injector is located to communicate with a pilot fuel injection site on the cylinder at or near the cylinder's longitudinal midline or at least near TDC for the opposed pistons. The pilot fuel injector injects a pilot charge, a small mass of liquid fuel in a fine mist of small droplets that provides a stoichiometric element, into the compressed homogenous main charge near TDC of the pistons. The stoichiometric element causes autoignition of the pilot charge, thereby activating ignition of the main charge.

With main fuel-injection positioned for delivery of a main charge early in the compression stroke, when the pistons are near BDC, and pilot fuel-injection near TDC of the opposing pistons to control ignition, the opposed piston compression ignition engine herein described constitutes a homogenous charge pilot injection (HCPI) engine that overcomes the drawbacks of HCCI engines to date by utilizing a liquid fuel and operating over a wide engine load range, including idle, cold start, and medium and heavy loads while substantially reducing NOx, hydrocarbon, CO and particulate exhausted pollutants.

BRIEF DESCRIPTION OF THE DRAWINGS

The below-described drawings are meant to illustrate principles and examples discussed in the following description. They are not necessarily to scale.

FIGS. 5A–5D are schematic side sectional elevation diagrams of a cylinder used in the engine of FIG. 1.

DETAILED DESCRIPTION

Figure 1:
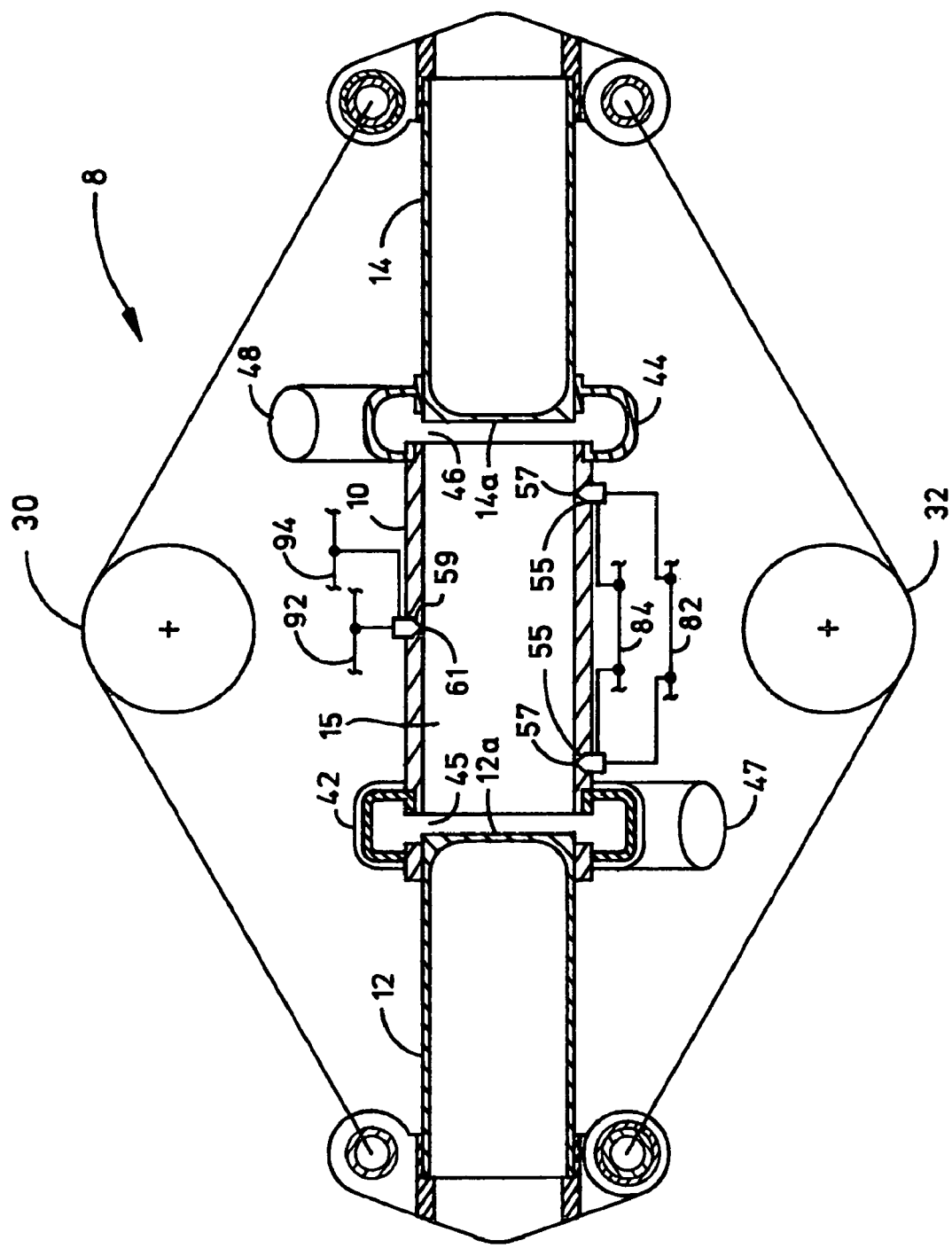
FIG. 1 is a partially schematic, side sectional view of an opposed piston engine, with the opposed pistons at or near bottom dead center (BDC), in which the inventive homogeneous charge pilot ignition (HCPI) principles can be implemented.

A two cycle, opposed piston internal combustion engine overcomes the difficulties associated with HCCI engines to date by providing injection of a main charge of a liquid fuel early in the compression stroke when the pistons are near BDC, full evaporation of the main charge under lean conditions as the piston moves toward TDC, and control of ignition of the main charge by injection of a pilot charge of a liquid fuel with a stoichiometric element sufficient to support autoignition near TDC of both pistons.

As used in this description, a "main charge" is a lean charge of a liquid fuel injected into an HCPI engine to be mixed with air and compressed between the pistons in the cylinder. Movement of the pistons toward each other and swirl induced by the intake manifold cause the air and the main charge to mix. The air and lean fuel mixture is compressed by the pistons as they mix, but, because the fuel is fully evaporated by the time an autoignition temperature range is reached, the compressed air/fuel mixture cannot autoignite.

As used in this description, a "pilot charge" is a charge of a liquid fuel injected into a compressed air/fuel mixture in the cylinder for the purpose of igniting the main charge. The pilot charge is injected as a fine mist comprising many very small droplets (for example about 50,000 droplets having an initial mean diameter of about 20 microns) that vaporize and exhibit a fuel concentration gradient including a region where the air/fuel mixture has the stoichiometric ratio necessary for autoignition. As a result, the pilot charge self-ignites and activates ignition of the lean compressed air/fuel mixture in the cylinder.

The main and pilot charges may comprise the same or different liquid fuels. Preferably, the main and pilot charges comprise diesel fuel.

It is the function of a main fuel injector to supply all or some portion of the main charge for full evaporation and mixing with air in a cylinder of the engine. It is the function of a pilot fuel injector to supply a pilot charge of the liquid fuel into the compressed main charge in order to activate ignition of the main charge.

In the opposed piston engine described in this specification at least one main fuel injector injects substantially all of the main charge through at least one main injection site on the cylinder wall when the pistons are near BDC, and both the exhaust and inlet ports of the cylinder are closed. For example, the at least one main injection site may be near the BDC of one of the opposed pistons. Alternatively, the at least one main injection site may be near TDC of the pistons, with adaptation for injecting liquid fuel in directions toward the inlet and exhaust ports.

In one exemplary implementation, two main fuel injectors divide the main charge of fuel for each cylinder of an opposed piston compression ignition engine, injecting portions of the main charge through injection sites in the cylinder wall, one near the intake port (slightly towards TDC) and the other near the exhaust port (slightly towards TDC). This locates main fuel injection at the coolest parts of the cylinder so that the main injector nozzles may be covered by the pistons for long periods of time during engine operation thus mitigating the undesirable effects of high temperature exposure inherent in conventional HCCI engines.

A main fuel injector comprises a nozzle with fuel jet orifices sized for delivery of all or a portion of a main charge to be delivered at full engine power. A main fuel injector nozzle may be oriented perpendicularly to the main injection site so as to project a fuel pattern along the diametrical center of the cylinder. As an example, in an opposed piston HCPI engine having a displacement of one liter and operating at 100 horsepower, a main fuel injector has a nozzle capable of delivering all or a portion of a maximum main charge of approximately 90 mm$^3$ to be mixed and compressed with approximately two liters of air. The nozzle positioned near the inlet or exhaust port may be so constructed as to project the fuel pattern in the direction of TDC in order to prevent the main fuel charge from contacting and condensing on the internal bore of the cylinder and the crowns of the pistons. By injecting the main charge near the intake and exhaust ports when the pistons are near BDC, internal pressure in the cylinder is relatively low and the droplets of the liquid fuel have a relatively long period to evaporate in the increasing temperature as the pistons move towards TDC. Further, when the main injector nozzles are closed, the opposing pistons moving towards TDC cover the nozzles so any trapped fuel in the orifices and tip wells of the nozzles cannot escape into the cylinder chamber, thus preventing the formation of CO or hydrocarbons during the power stroke. By the time the pistons are nearly at TDC, the main charge is fully evaporated and compressed. However, it lacks sufficient stoichiometric elements to initiate autoignition, even at the elevated temperature resulting from compression of the main charge.

As another example, the nozzle of a main fuel injector is positioned between the inlet or exhaust ports near the longitudinal center of the cylinder and may be so constructed as to project the fuel pattern bidirectionally, in one direction toward the exhaust port and in an opposing direction toward the inlet port in order to prevent the main fuel charge from contacting and condensing on the internal bore of the cylinder and the crowns of the pistons. The main fuel injector is operated so as to inject in this manner when the pistons are near BDC and both ports are closed at the beginning of the compression stroke. By injecting the main charge toward the intake and exhaust ports at the beginning of the compression stroke, internal pressure in the cylinder is relatively low and the droplets of the liquid fuel have a longer period to evaporate in the increasing temperature as the pistons move towards TDC. By the time the pistons are nearly at TDC, the main charge is fully evaporated and the air/fuel mixture is highly compressed. However, the compressed air/fuel mixture lacks any stoichiometric elements to initiate autoignition, even at the elevated temperature resulting from compression of the main charge.

In the opposed piston HCPI engine at least one pilot injector is provided for injection of a pilot charge through a site on the cylinder near TDC. Preferably, although without limitation, the pilot charge may comprise a mass of 0.2%, or less, of the total mass of the maximum main charge. The nozzle of a pilot injector may have one or more orifices with very small diameters suitable for delivering a fine mist of liquid fuel with a high count of very small droplets of the liquid fuel. In the example given above, the nozzle of the pilot injector may have orifices with diameters of about 10–20 microns, which would be suitable for delivering a fine mist of about 10,000 to 100,000 very small drops of fuel totaling on the order of 0.2 mm$^3$, or less. The small size and high count of the droplets enable the pilot charge to provide a stoichiometric mixture region or element that autoignites in the hot, highly pressurized, air/fuel mixture and thereby activates ignition of the main charge. With appropriate control of pilot injection by a pilot fuel injection system, ignition of the main charge can be triggered at an optimum time according to engine operating conditions. The pilot fuel injector is therefore the combustion activating element of the engine.

As thus described, an opposed piston HCPI engine may provide continuous, single mode operation. The pilot fuel injector will ensure consistent ignition in cold start conditions.

The pilot fuel injector may be the sole combustion activating element of the engine, or it may be supplemented by an electrically-activated ignition element such as a spark plug or other means of sufficient energy (a laser, for example) to enhance combustion.

The opposed piston HCPI engine herein described overcomes the most troublesome elements of any HCCI engine to date by operating over a wide load range, including idle, cold starts, and medium and heavy loads, while substantially reducing exhausted pollutants including NOx, hydrocarbons, CO and particulates.

An opposed piston HCPI internal combustion engine may be realized in the context of the two cycle, opposed piston compression ignition engine described in U.S. patent application Ser. No. 10/865,707, filed Jun. 10, 2004 by James U. Lemke et al. and assigned to the assignee of this application; the '707 patent application is incorporated by reference herein. This context is meant to be illustrative only and is not intended to constrain the principles to be set forth herein only to the specific engine of the '707 application.

Referring now to FIG. 1, an internal combustion engine 8 is illustrated. The engine 8 is an opposed piston diesel engine having one or more cylinders; the figure shows one such cylinder 10. A pair of pistons 12 and 14 is slidably disposed in the central bore 15 of the cylinder 10. The pistons 12 and 14 move coaxially in the cylinder 10 in opposed motions, toward and away from each other. FIG. 1 illustrates the pistons 12 and 14 near bottom dead center, where they are at the end of their exhaust/power strokes. The piston 12 has a crown 12a that faces the crown 14a of the piston 14. Each of the pistons 12, 14 is coupled to two side-mounted crankshafts 30, 32 by rods that extend from the piston along the sides of the cylinder 10, at acute angles to the sides of the cylinder 10, to each of the crankshafts 30, 32. The structure of these couplings is described in detail in the incorporated '707 patent application. Port manifolds 42 and 44 fixed at respective ends of the cylinder 10 provide exhaust and inlet ports 45 and 46. The inlet port 46 and exhaust port 45 may be scrolled in order to induce swirling of pressurized air entering the bore 15 of the cylinder through the inlet port 46. The pistons 12 and 14 control the ports 45 and 46 as they move between their BDC and TDC positions. Combustion products are exhausted from each cylinder 10 through an exhaust manifold 47; air is supplied to each cylinder 10 through an intake manifold 48.

The engine 8 includes at least one main fuel injector 55 supplied for each cylinder 10. In the example of FIG. 1, two main fuel injectors 55 are provided for each cylinder 10. Each main fuel injector 55 includes a nozzle positioned to provide all or a portion of a main charge of a liquid fuel through a main injection site 57 that opens through the side wall of the cylinder. Each main injection site 57 is located near a port, inboard of the port manifold, slightly toward TDC of the piston controlling the port.

The engine 8 includes at least one pilot fuel injector 59 supplied for each cylinder 10. In the example of FIG. 1, a single pilot fuel injector is provided for each cylinder 10. Each pilot fuel injector 59 includes a nozzle positioned to provide all or a portion of a pilot charge of a liquid fuel through a pilot injection site 61 that opens through the side wall of the cylinder 10. Each pilot injection site 61 is located between the TDC positions of the piston crowns 12a and 14a, at or near the longitudinal midpoint of the cylinder 10.

In one aspect of an HCPI opposed piston engine each of the main and pilot charges is constituted of a liquid fuel. The same liquid fuel may be supplied for the main and pilot charges. For example, the liquid fuel may comprise diesel fuel. Alternatively, the liquid fuels may be different fuels.

Figure 2:
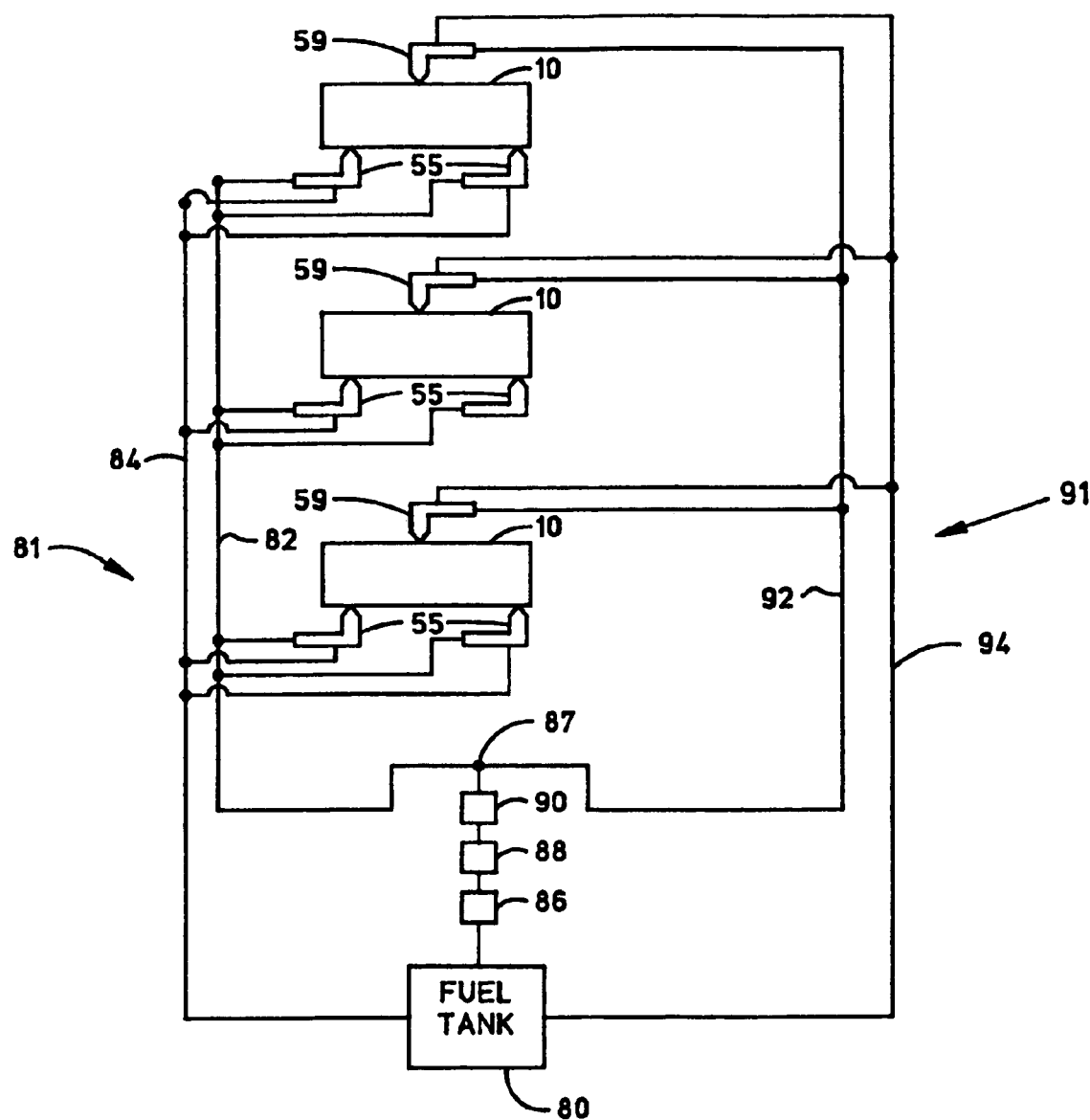
FIG. 2 is a schematic diagram of main and pilot fuel injection systems for use in the engine of FIG. 1.

Referring to FIGS. 1 and 2, an exemplary fuel injection system using a common rail configuration and electronic actuation is illustrated wherein a fuel tank 80 supplies the liquid fuel to main fuel injectors 55 and pilot fuel injectors 59. In these figures, a main fuel injection system operates the main fuel injectors in response to varying engine operating conditions, thereby to synchronize injection of the main fuel charge with varying engine operational conditions. A pilot injection system operates the pilot fuel injector in response to engine operating conditions, thereby to synchronize injection of the pilot fuel charge with varying engine operational conditions. The engine 8 is presumed to have three cylinders. The pistons are omitted from these figures as an aid in explaining the fuel injection system design.

In FIG. 2, the output of a fuel tank 80 is connected through a pre-pump 86, a filter 88, an in-line fuel-injection pump 90, and a node 87 to main and pilot fuel injection systems 81 and 91. The main fuel injection system 81 includes a common rail 82 off the node 87 and connecting each main fuel injector 55 to receive the liquid fuel from the fuel tank 80, and a return line 84 returning each main fuel injector 55 to the fuel tank 80. The pilot fuel injector system 91 includes a common rail 92 off the node 87 and connecting each pilot fuel injector 59 to receive the liquid fuel from the fuel tank 80, and a return line 94 returning each pilot fuel injector 59 to the fuel tank 80. The liquid fuel is, preferably, diesel fuel.

The main fuel injector 55 used in the engine 8 may be constituted of an electrically-controlled, mechanically actuated fuel injector including a nozzle with an array of orifices arranged to spray all or a portion of a main charge through a main injection site 57 into the bore of the cylinder 10. For example when two main fuel injectors 55 are provided for a cylinder 10, each would be operated to spray half of the main charge into the bore of the cylinder. In the main fuel injection system 81 of FIG. 2, each main fuel injector 55, including delivery valve mechanism and nozzle, may be conventionally mounted to the cylinder at a main injection site with the nozzle at the injection site. Alternatively, a main fuel injector may have a delivery valve mechanism mounted separately from the nozzle, with a high pressure line connecting the mechanism to the nozzle. In the opposed piston engine 8, the orifices of each main fuel injector nozzle are arranged in an array that results in fuel being injected in a cloud or mist of droplets directed substantially along the longitudinal centerline of the cylinder, in the direction of TDC, away from the port near which the main fuel injector is located.

The pilot fuel injector 59 used in the engine 8 may be constituted of an electrically-controlled, mechanically actuated fuel injector of the pressure intensified accumulator type including a nozzle with an array of orifices arranged to spray all or a portion of a main charge through a pilot injection site 61 into the bore of the cylinder. Preferably a single pilot fuel injector is conventionally mounted to the cylinder at a pilot injection site, although the delivery valve mechanism and nozzle may be mounted separately and connected with a high pressure line. In the opposed piston engine nozzle orifices of each pilot fuel injector are arranged in an array that results in fuel being injected in a cloud or mist of very small droplets directed substantially perpendicularly to the longitudinal centerline of the cylinder.

Figure 3:
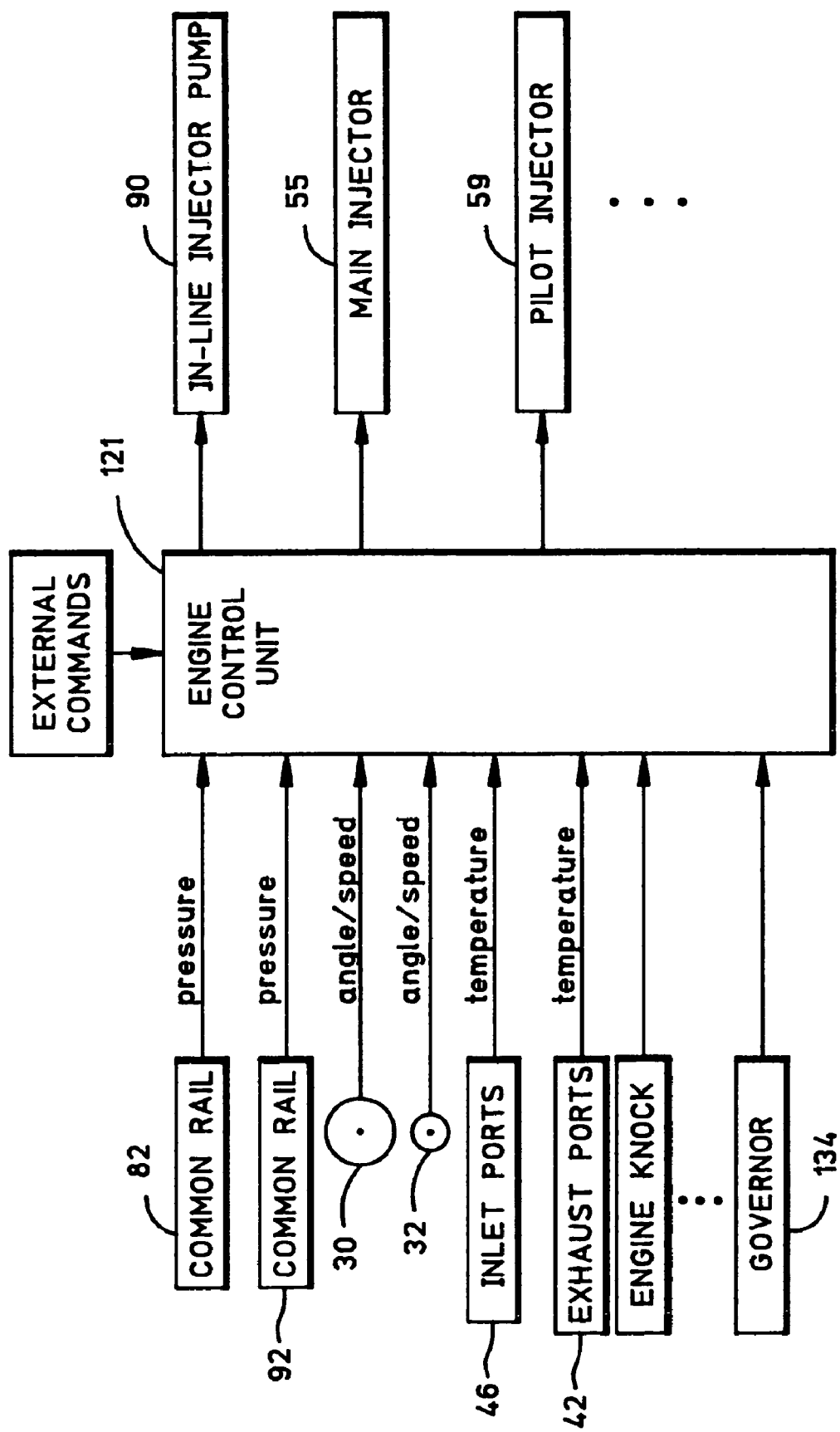
FIG. 3 is a block diagram of an engine control unit used in the engine of FIG. 1.

The engine 8 includes an electronic control unit (ECU) 121 shown in FIG. 3. The ECU 121 is preferably used in the engine 8 to monitor engine parameters and to manage and control aspects of engine operation. If, as in FIG. 2, the main and pilot fuel injection systems are electronically controlled, the ECU 121 may also control the operations of those systems. The ECU 121 may perform these tasks by monitoring parameters of engine operation, by controlling the operations of the in-line fuel injection pump 90 to provide liquid fuel at pressure to the common rails 82 and 92, and by controlling the operations of the main and pilot fuel injectors 55 and 59 in injecting liquid fuel into the engine. The monitored parameters include, without limitation, fuel pressure in the common rails 82 and 92, engine speed, crankshaft angles, air temperature at the inlet ports, exhaust temperature at the exhaust ports, pressure in the exhaust and intake manifolds 47 and 48, and engine knock level. The ECU 121 produces control signals for the in-line fuel injection pump 90 for maintaining or changing pressure in the common rails 82 and 92 and control signals for controlling and timing the operations of the main and pilot fuel injectors 55 and 59. Other engine parameters (not shown) are provided to the ECU 121 to control other engine functions (not shown).

The ECU 121 includes memory, processing functionality and programming to receive and convert engine parameter values, perform mathematical calculations and logical operations on the converted values, and produce the pump and injector control signals as outputs synchronized with engine operation. For each main and pilot fuel injector, the ECU 121 calculates the amount of fuel to be injected by the injector, the pressure required in the common rail, and the timing of the injector operation. The initiation of fuel injection by the injector is initiated in response to a crankshaft angle corresponding to the timing.

The main and pilot fuel injection systems are operated by the ECU (or other arrangement) to maintain control of fuel delivery in the face of varying engine conditions. In this regard, as engine operating load varies, the mass of the liquid fuel constituting the main charge delivered to the engine through the main fuel injector system may be modulated to accommodate the changing demands of the engine. For example, the main charge mass will generally vary between an amount necessary to maintain an engine idle speed and an amount necessary for maximum engine speed. However, good practice may require that the mass of the liquid fuel constituting the pilot charge be maintained at a constant amount, less than the amount of mass of the main charge required to maintain the engine at its idle speed.

Figure 4:
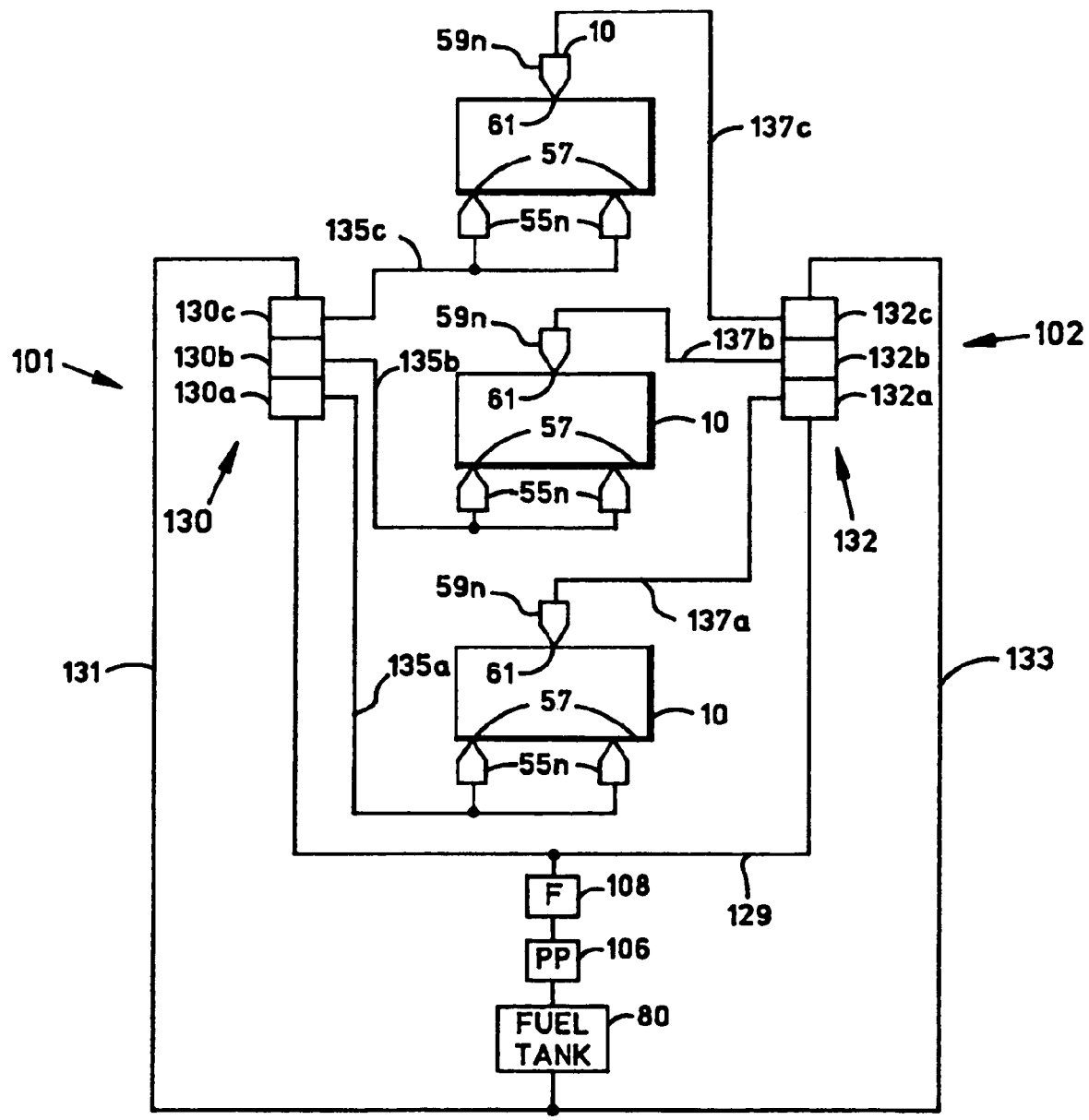
FIG. 4 is a schematic diagram of alternate main and pilot fuel injection systems for use in the engine of FIG. 1.

The engine 8 described in this specification may also use mechanically controlled and actuated main and pilot fuel injectors; see FIG. 1 in this regard. In FIG. 4, a main fuel injection system operates the main fuel injectors in response to varying engine operating conditions, thereby to synchronize injection of the main fuel charge with varying engine operational conditions. A pilot injection system shown in FIG. 4 operates the pilot fuel injector in response to engine operating conditions, thereby to synchronize injection of the pilot fuel charge with varying engine operational conditions. The engine 8 is presumed to have three cylinders. The pistons are omitted from these figures as an aid in explaining the fuel injection system design and operation.

In FIGS. 1 and 4, an exemplary fuel injection system using an in-line fuel-injection pump configuration and mechanical actuation is illustrated wherein a fuel tank 80 supplies a liquid fuel to main and pilot fuel injectors by way of a pre-pump 106 and a filter 108 feeding a fuel line 129. The fuel line 129 provides fuel to main and pilot fuel injection systems 101 and 102. In FIG. 4, the main fuel injection system 101 includes an in-line fuel-injection pump 130 to receive liquid fuel from the line 129, and a return line 131 connecting the pump 130 to the fuel tank 80. The pump 130 includes three delivery valve mechanisms 130a, 130b, and 130c. Each delivery valve mechanism delvers a main fuel charge that is provided through a respective line (135a, 135b, 135c) to a pair of main fuel injection nozzles 55n at main fuel injection sites 57. In FIG. 4, the pilot fuel injection system 102 includes an in-line fuel-injection pump 132 to receive liquid fuel from the line 129, and a return line 133 connecting the pump 132 to the fuel tank 80. The pump 132 includes three delivery valve mechanisms 132a, 132b, and 132c. Each delivery valve mechanism delvers a pilot fuel charge that is provided through a respective line (137a, 137b, 137c) to a pilot fuel injection nozzles 59n at a fuel injection site 61.

Each main fuel injector nozzle 55n has an array of orifices arranged to spray all or a portion of a main charge through a main injection site 57 into the bore of the cylinder 10. In the opposed piston engine 8, the orifices of each main fuel injector nozzle are arranged in an array that results in fuel being injected in a cloud or mist of droplets directed substantially along the longitudinal centerline of the cylinder, in the direction of TDC, away from the port near which the main fuel injector is located.

Each pilot fuel injector nozzle 59n used in the engine 8 may be driven by a fuel injector delivery valve mechanism of the pressure intensified accumulator type that may include an array of orifices arranged to spray all or a portion of a pilot charge through a pilot injection site 61 into the bore of the cylinder. Preferably a single pilot fuel injector nozzle is conventionally mounted to the cylinder at each pilot injection site. In the opposed piston engine 8 nozzle orifices of each pilot fuel injector are arranged in an array that results in fuel being injected in a cloud or mist of very small droplets directed substantially perpendicularly to the longitudinal centerline of the cylinder.

In the in-line fuel injection systems of FIG. 4, the pumps 130 and 132 are conventionally driven by cam arrangements linked by known means (not illustrated) to at least one of the crankshafts 30, 32 shown in FIG. 1. A governor 134 (shown in FIG. 3) may be provided for either or both of the pumps 130 and 132 to maintain control of fuel delivery in the face of varying engine conditions as described above in connection with the fuel injection systems of FIG. 2.

Other fuel injection mechanisms and systems than those shown in the preceding figures may be used. For example, an integrated unit injector or unit pump may be individually mounted at or near each cylinder for each injection site.

The homogeneous charge pilot ignition operation of the engine 8 is illustrated in FIGS. 5A–5D. In these figures, HCPI operation is based upon the fuel injection configuration of FIG. 2, with two main injectors 55 for the cylinder 10, each mounted in the engine 8 to provide substantially half of a main charge through an injection site 57. Further, only a single pilot injector 59 is shown. This is not meant to limit the scope of these teachings as a single main injector 55 or more than two main injectors 55 may also be used, in the position of either of the two main injectors shown in these figures. Further, more than a single pilot injector 59 may be used.

FIGS. 5A–5D are schematic representations of the cylinder 10 and pistons 12 and 14 of FIG. 1 illustrating a sequence of steps representing operation of an opposed piston HCPI engine, particularly an inlet/compression stroke of the engine 8. This sequence is merely for the purpose of explanation; it is not meant to exclude other possible sequences. With reference to FIG. 5A, the cylinder 10 has a longitudinal centerline 139 coincident with the axis of the cylinder and a longitudinal midpoint 140 on the centerline. The term "bottom dead center" refers to the location of a piston when the port it controls is fully or maximally open. With reference to FIGS. 5A and 5D, the term "top dead center" is used to refer to the point where the space between the crowns 12a and 14a of the pistons 12 and 14 is minimum and the main charge is substantially homogenous and most highly compressed in the bore of the cylinder.

As the following illustrations and description will establish, the relation between piston length, the length of the cylinder, and the length added to the cylinder bore by the cylinder manifolds, coupled with a phase difference between the pistons as they traverse their bottom dead center positions, modulate port operations and sequence them correctly with piston events. In this regard, exhaust and inlet ports 45 and 46 are displaced axially from the longitudinal center of the cylinder 10, near its ends. The pistons 12 and 14 may be of equal length. Each piston 12 and 14 keeps the associated port 45 or 46 of the cylinder 10 closed until it approaches its bottom dead center position. The phase offset between the bottom dead center positions produces a sequence wherein the exhaust port 45 is uncovered by the piston 12, and therefore opens, when the piston 12 moves near its bottom dead center position, then the inlet port 46 is uncovered by the piston 14, and therefore opens, when the piston 14 moves near its bottom dead center position, following which the exhaust port 45 is covered by the piston 12, and therefore closes, after the piston 12 moves away from its bottom dead center position, and then the inlet port 46 is covered by the piston 14, and therefore closes, after the piston 14 moves away from its bottom dead center position.

In this example, with the pistons 12 and 14 near their BDC positions, the crowns 12a and 14a are positioned outwardly of the exhaust and inlet ports 45 and 46. The piston 12 has moved through BDC and begun to advance toward TDC. The piston 14 is still moving toward BDC. Both ports 45 and 46 are uncovered and open and the products of combustion are forced out of the cylinder through the exhaust port 45 into the exhaust manifold 47 by scavenging air under pressure flowing into the cylinder through the inlet manifold 48. If the ports 45 and 46 are scrolled, the scavenging air swirls 145 in the cylinder 10. Neither the main fuel injectors 55 nor the pilot fuel injector 59 are activated.

In FIG. 5B, the piston 12 has advanced far enough toward TDC to cover and close the exhaust port 45. The piston 14 has moved through BDC and begun to advance toward TDC. The inlet port 46 is still open and air to support combustion flows into the cylinder. Again, if the ports are scrolled, the air swirls 145 in the cylinder 10. Neither the main fuel injectors 55 nor the pilot fuel injector 59 are activated.

In FIG. 5C, the piston 14 has advanced far enough toward TDC to cover and close the inlet port 46 resulting in a captured volume of combustion air. The piston 12 continues to advance toward TDC. The exhaust port 45 remains closed. Both main fuel injectors 55 are activated by the ECU 121, each injecting about half of the main charge 200 into the captured volume. The quantity of the main charge yields a lean air/fuel mixture in which X, the ratio of the amount of air to the stoichiometric amount of air required to support combustion, is equal to or greater than 2. The orifices in the nozzles of the main fuel injectors are arrayed so as to project the respective portions of the main charge as patterns of fuel droplets along the longitudinal centerline 139, and toward the longitudinal midpoint 140, away from the crowns 12a and 14a and the bore of the cylinder 10. This reduces the amount of fuel that condenses on and wets those surfaces and mitigates the production of unburned hydrocarbons by the engine 8. When the main charge is injected, the pistons 12 and 14 are still near BDC. The injected main charge thus has a relatively long period of time while the pistons approach TDC to mix with the air heated by compression. As a result, virtually all of the injected fuel will have evaporated by the time the pistons 12 and 14 near TDC. Consequently, the air/fuel mixture will be virtually homogenous when the pistons 12 and 14 near TDC. However, because the fuel is virtually completely evaporated, the resulting air/fuel mixture has no region of stoichiometric mixture ratio and autoignition cannot occur.

Referring now to FIG. 5D, just prior to the pistons 12 and 14 reaching TDC, the pilot fuel injector 59 is activated by the ECU 121 in response to a detected crank angle and a pilot charge 210 constituted of a very fine mist of liquid fuel comprising very small droplets (for example droplets having an initial mean diameter of about 10 microns) is injected into the highly compressed and therefore very hot air/fuel mixture. The pilot charge 210 rapidly vaporizes and exhibits a fuel concentration gradient including a region where the air/fuel mixture has the stoichiometric ratio necessary for autoignition. As a result, the pilot charge 210 self-ignites and activates ignition of the lean compressed air/fuel mixture in the cylinder, between the crowns of the pistons.

Since the main charge 200 is lean and is nearly, if not completely, evaporated at the point of ignition, total combustion of the fuel will result, substantially reducing exhausted pollutants including NOx, hydrocarbon, CO and particulate.

Because the main charge 200 is injected early during the compression stroke, even under high load conditions the fuel has adequate time to thoroughly evaporate and mix with the air. During very low load periods of operation, such as idling, the pilot fuel injector 59 may provide adequate fuel to maintain operation without activating the main fuel injectors 55.

Other advantages realized by HCPI operation of the engine 8 may be understood with reference to FIGS. 5A–5D. Such advantages include protection of the main fuel injectors 55 from the high pressures and high temperatures resulting from compression and combustion that occur in the cylinder when the air/fuel mixture combusts. As best seen in FIGS. 5C and 5D, the injection sites 57 are covered by the cylinders 12 and 14 as the cylinders travel to and from TDC, thereby protecting the nozzles of those injectors from the high pressure and temperature of the compressed air/fuel mixture and from the heat and turbulence of combustion.

Figure 6A:
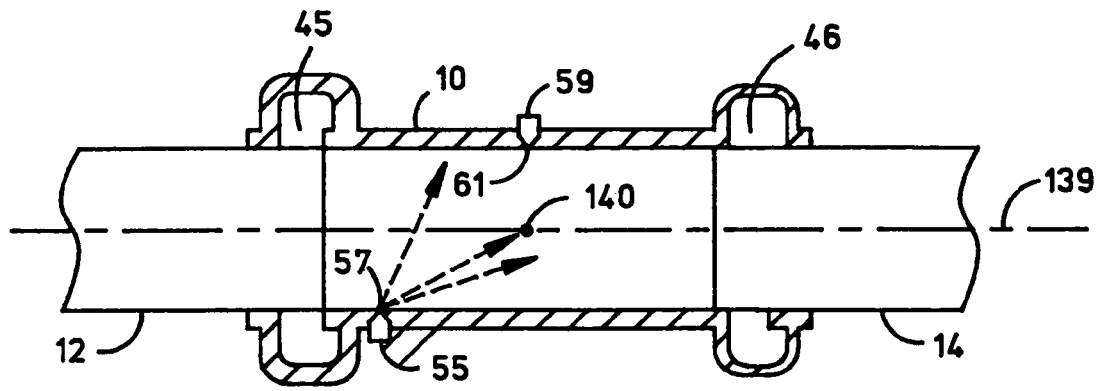
FIGS. 6A–6C are partially schematic side sectional elevation views of a cylinder used in the engine of FIG. 1 showing fuel injection sites and electrical augmentation of pilot ignition.
Figure 6B:
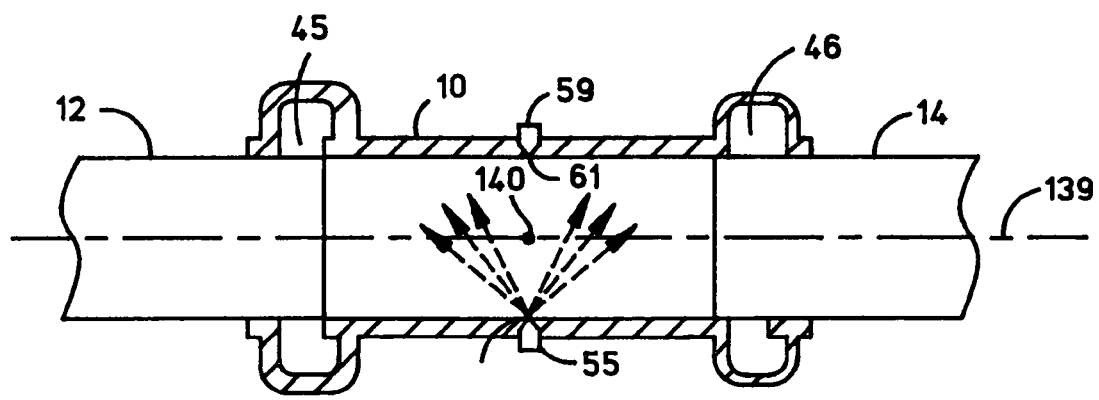
Figure 6C:
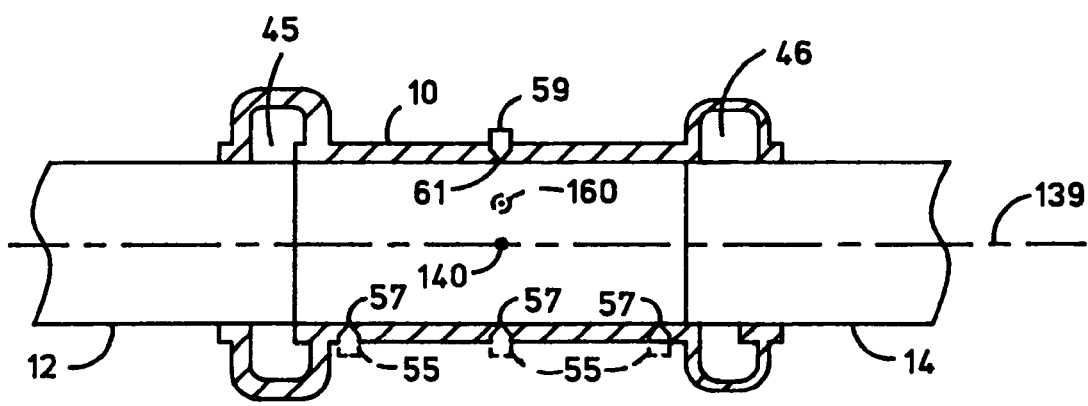

The previous examples have all been predicated on the provision of two main fuel injectors, and use of the pilot injector as the sole ignition element. FIGS. 6A–6C show alternative arrangements. In FIG. 6A, only a single main fuel injection site 57 served by a single main injector 55 is provided. The main fuel injection site 57 is in the cylinder 10 near one of the ports 45 or 46 displaced slightly toward TDC of the piston controlling the port; in FIG. 6A, the main fuel injection site 57 is near the exhaust port 45. The fuel injector nozzle in this configuration has orifices disposed to inject the entire main charge in the direction of the opposing port. In FIG. 6B, at least one main fuel injection site 57 is located on the cylinder 10 at or near a diameter passing through the midpoint 140. The fuel injector nozzle in this configuration has orifices disposed to inject the entire main charge toward the ports 45 and 46, away from the midpoint 140. In the configurations of FIGS. 6A and 6B, the main fuel injection systems (not shown) are operated to inject the main charge early in the compression ignition stroke, while the pistons (not shown) are near their BDC positions but ports 45 and 46 are closed. In FIG. 6C, an electrically-actuated ignition element 160, such as a spark plug, is provided to augment the ignition function of the pilot injector 59. The element 160 is positioned near the midpoint 140 and may be laterally or arcuately displaced from the pilot injection site 61; for reference, one or more possible sites 57 for main fuel injectors 55 are shown in the cylinder 10.

It should be noted that, the inventive principles set forth herein are not limited to the embodiments, which are meant to be illustrative only. As an example, additional main fuel injectors 55 could be installed longitudinally along the cylinder wall in the direction of TDC in order to provide multiple stage injection of the main charge. Further, the principles described herein may apply to two-cycle or four-cycle dual piston or single piston engines. Otherwise, these principles are limited only by the following claims:

What is claimed is:

1. A method of operating an opposed piston compression ignition engine including a cylinder, a pair of opposed pistons in the bore of the cylinder and spaced-apart inlet and exhaust ports controlled by the pistons, comprising:
   introducing air into the cylinder between the pistons;
   moving the pistons toward each other;
   injecting a lean main charge of liquid fuel into the cylinder between the pistons through at least one main injection site on the cylinder between the inlet port and the exhaust port;
   in response to movement of the pistons, the main charge fully evaporating before an autoignition temperature is reached; and then
   injecting a pilot charge of liquid fuel through at least one pilot injection site located differently from the at least one main injection site;
   the pilot charge igniting the evaporated main charge.

2. The method of claim 1, wherein the mass of the pilot charge is less than the mass of the main charge required to idle the engine.

3. The method of claim 2, further including modulating the mass of the main charge in response to at least one engine operating condition.

4. The method of claim 1, wherein injecting a main charge includes injecting a first portion of the main charge through a main injection site on the cylinder near the inlet port and injecting a second portion of the main charge through a main injection site on the cylinder near the exhaust port.

5. The method of claim 4, wherein the pistons cover the main injection sites while moving toward each other.

6. The method of claim 1, wherein injecting a main charge includes injecting a first portion of the main charge through a main injection site on the cylinder near the inlet port in a direction away from the inlet port along a longitudinal centerline of the cylinder and injecting a second portion of the main charge through a main injection site on the cylinder near the exhaust port in a direction away from the exhaust port and along the longitudinal centerline.

7. The method of claim 6, wherein the pistons cover the main injection sites while moving toward each other.

8. The method of claim 1, wherein injecting a main charge includes injecting at least a portion of the main charge through at least one main injection site on the cylinder near top dead center of the pistons.

9. The method of claim 1, further including swirling the air introduced into the cylinder.

10. The method of claim 1, further including electrically augmenting ignition of the main charge.

11. The method of claim 1, wherein the main charge includes diesel fuel.

12. The method of claim 11, wherein the pilot charge includes diesel fuel.

13. A method of operating an opposed piston compression ignition engine including a cylinder with opposing pistons disposed in the cylinder and spaced apart inlet and exhaust ports, comprising:
    introducing air into the cylinder between the pistons;
    moving the pistons toward each other;
    injecting a lean main charge of liquid fuel into the cylinder between the pistons through at least one main injection site on the cylinder between the inlet port and the exhaust port;
    in response to movement of the pistons, the main charge fully evaporating before an autoignition temperature is reached; and then
    injecting a pilot charge of liquid fuel through at least one pilot injection site near the longitudinal midpoint of the cylinder and located differently from the at least one main injection site;
    the pilot charge igniting the evaporated main charge.

14. The method of claim 13, wherein the mass of the pilot charge is less than the mass of the main charge required to idle the engine.

15. The method of claim 13, wherein injecting the main charge includes injecting a first portion of the main charge through a main injection site on the cylinder near the inlet port and injecting a second portion of the main charge through a main injection site on the cylinder near the exhaust port.

16. The method of claim 15, wherein the pistons cover the main injection sites while moving toward each other to compress the air/fuel mixture.

17. The method of claim 13, wherein injecting a main charge includes injecting a first portion of the main charge through a main injection site on the cylinder near the inlet port in a direction away from the inlet port along a longitudinal centerline of the cylinder and injecting a second portion of the main charge through a main injection site on the cylinder near the exhaust port in a direction away from the exhaust port and along the longitudinal centerline.

18. The method of claim 17, wherein the pistons cover the main injection sites while moving toward each other to compress the air/fuel mixture.

19. The method of claim 13, wherein injecting a main charge includes injecting at least a portion of the main charge through at least one main injection site on the cylinder near the longitudinal midpoint of the cylinder in directions toward the inlet and exhaust ports.

20. The method of claim 13, wherein the main charge and the pilot charge include diesel fuel.

21. A compression ignition engine, comprising:
    a cylinder;
    a pair of opposing pistons slidably disposed in the cylinder;
    spaced-apart inlet and exhaust ports near respective ends of the cylinder;
    at least one main fuel injector communicating with the bore of the cylinder through a main injector site in the cylinder between the inlet port and the exhaust port;
    at least one pilot fuel injector communicating with the bore through a pilot injector site in the cylinder near a longitudinal midpoint of the cylinder and located differently from the main injection site; and a fuel injection system coupled to the at least one main fuel injector and to the at least one pilot fuel injector for operating the at least one main fuel injector when the pistons are near bottom dead center positions and then operating the at least one pilot fuel injector when the pistons are near top dead center positions.

22. The engine of claim 21, wherein the at least one main fuel injector includes a first main fuel injector for injecting a first portion of the main charge through a main injection site on the cylinder near the inlet port and a second main fuel injector for injecting a second portion of the main charge through a main injection site on the cylinder near the exhaust port.

23. The engine of claim 21, wherein the at least one main fuel injector includes a first main fuel injector for injecting a first portion of the main charge through a main injection site on the cylinder near the inlet port in a direction toward the longitudinal midpoint and a second main fuel injector for injecting a second portion of the main charge through a main injection site on the cylinder near the exhaust port in a direction toward the longitudinal midpoint.

24. The engine of claim 21, wherein the at least one main fuel injector includes a main fuel injector for injecting at least a portion of the main charge through at least one main injection site on the cylinder near top dead center locations of the pistons in directions toward the inlet and outlet ports.

25. The engine of claim 21, wherein the fuel injection system controls the mass of the main charge in response to at least one engine operating condition and maintains the mass of the pilot charge at a magnitude less than the magnitude of the mass of the main charge required to idle the engine.

26. An internal combustion engine, comprising:
a cylinder with spaced-apart inlet and exhaust ports;
opposing pistons disposed in a central bore of the cylinder;
a first main fuel injector positioned at an injection site on the cylinder near the inlet port;
a second main fuel injector positioned at an injection site on the cylinder near the exhaust port;
a main fuel injection system connected to the main fuel injectors;
a pilot fuel injector positioned at an injection site between respective top dead center positions of the pistons; and
a pilot fuel injection system connected to the pilot fuel injector.

27. The engine of claim 26, wherein the first main fuel injector is for injecting a first portion of a main charge of liquid fuel in a direction away from the inlet port and the second main fuel injector is for injecting a second portion of the main charge of liquid fuel in a direction away from the exhaust port.

28. The engine of claim 27, wherein the main fuel injection system is for providing diesel fuel to the first and second main fuel injectors.

29. The engine of claim 28, wherein the pilot fuel injection system is for providing diesel fuel to the pilot fuel injector.

30. An internal combustion engine, comprising:
a cylinder with spaced-apart inlet and exhaust ports;
opposing pistons disposed in the bore of the cylinder;
at least one main fuel injector communicating with the bore through at least one main injection site on the cylinder between the inlet port and the exhaust port;
a main fuel injection system connected to the at least one main fuel injector for operating the at least one main fuel injector when the pistons are near bottom dead center positions;
a pilot fuel injector communicating with the bore through at least one injection site near a longitudinal midpoint of the cylinder and located differently from the at least one main injection site;
a pilot fuel injection system connected to the pilot fuel injector for operating the pilot fuel injector when the pistons are near top dead center positions; and
an electrical ignition element mounted to the cylinder.

31. The internal combustion engine of claim 30, further including a scroll in the inlet port.

32. A fuel injection combination for an opposed piston compression ignition engine, comprising:
a cylinder with spaced-apart inlet and exhaust ports;
opposing pistons disposed in a bore of the cylinder for moving between bottom dead center and top dead center positions;
at least one main fuel injector communicating with the bore through at least one main injection site on the cylinder between the inlet port and the exhaust port;
at least one pilot fuel injector communicating with the bore through at least one pilot injection site near a longitudinal midpoint of the cylinder and located differently from the main injection site; and
control means for operating the least one main fuel injector when the pistons are near their bottom dead center positions and operating the at least one pilot fuel injector when the pistons are near their top dead center positions.

33. A fuel injection combination for an opposed piston compression ignition engine, comprising:
a cylinder with spaced-apart inlet and exhaust ports;
opposing pistons disposed in a bore of the cylinder;
a first main fuel injector communicating with the bore through a first main injection site on the cylinder near the inlet port, the first main fuel injector for injecting a first portion of a main charge of liquid fuel through the first main injection site in a direction toward the longitudinal midpoint; and
a second main fuel injector communicating with the bore through a second main injection site on the cylinder near the exhaust port, the second main fuel injector for injecting a second portion of the main charge of liquid fuel through the second main injection site in a direction toward the longitudinal midpoint.

34. An opposed piston compression ignition engine, comprising:
at least one cylinder with spaced-apart inlet and exhaust ports, a bore and a longitudinal midpoint;
opposed pistons disposed in the bore for moving between top dead center and bottom dead center positions;
at least one main fuel injector communicating with the bore through at least one main injection site on the cylinder between the inlet and exhaust ports;
at least one pilot fuel injector communicating with the bore through a pilot injection site on the cylinder near the longitudinal midpoint and located differently from the at least one main injection site; and
control means for operating the at least one main fuel injector when the pistons are near their bottom dead center positions and operating the at least one pilot fuel injector when the pistons are near their top dead center positions.

35. The opposed piston compression ignition engine of claim 34, wherein the at least one main injection site includes a main injection site near the exhaust port.

36. The opposed piston compression ignition engine of claim 34, wherein the at least one main injection site includes a main injection site near the inlet port.

37. The opposed piston compression ignition engine of claim 34, the at least one main fuel injector including a first main fuel injector communicating with the bore through a main injection site on the cylinder near the exhaust port and a second main fuel injector communicating with the bore through a main injection site on the cylinder near the inlet port.

* * * * *

UNITED STATES PATENT AND TRADEMARK OFFICE
CERTIFICATE OF CORRECTION

| | |
|---|---|
| PATENT NO. | : 7,270,108 B2 |
| APPLICATION NO. | : 11/095250 |
| DATED | : September 18, 2007 |
| INVENTOR(S) | : Lemke |

Page 1 of 1

It is certified that error appears in the above-identified patent and that said Letters Patent is hereby corrected as shown below:

On the Title Page, Item (56) should include the following:

FOREIGN PATENT DOCUMENTS

| | |
|---|---|
| GB 527,873 | 10/1940 |
| GB 552,850 | 10/1943 |
| FR 2 571 096 | 04/1986 |
| WO 2004/046521 | 06/2004 |
| WO 2006/105390 | 10/2006 |

Signed and Sealed this

Eighth Day of September, 2009

David J. Kappos
*Director of the United States Patent and Trademark Office*